3,641,206
THERMOPLAST MOULDING COMPOSITIONS

Hans Weitzel, Leverkusen, Karl Dinges, Cologne-Stammheim, Wilhelm Göbel, Cologne-Flittard, and Dietrich Hardt, Bonn, Germany, assignors to Farbenfabriken Bayer Aktiengesellschaft, Leverkusen, Germany
No Drawing. Continuation of application Ser. No. 541,067, Apr. 8, 1966. This application Mar. 5, 1969, Ser. No. 806,028
Claims priority, application Germany, Apr. 21, 1965, F 45,864
Int. Cl. C08f 29/24, 33/08, 41/12
U.S. Cl. 260—876 R                                4 Claims

ABSTRACT OF THE DISCLOSURE

Mixture comprising 30 to 95% by weight of a brittle and hard polymer such as a homopolymer or copolymer of styrene and 70 to 5% by weight of an elasticizing graft polymer of vinyl chloride on ethylene/vinyl acetate, said mixture being useful as a thermoplastic-elastic moulding composition distinguished by high notched impact and impact strengths and excellent resistance to aging and non-inflammability.

CROSS-REFERENCE TO RELATED APPLICATION

This application is a continuation of application Ser. No. 541,067 filed Apr. 8, 1966, and now abandoned.

This invention relates to moulding compositions based on elastic-thermoplastic graft copolymers exhibiting outstanding mechanical properties, in particular high impact and notched impact strength, coupled with good processing properties and an excellent resistance to ageing.

It is known that, by mixing a rubber component, i.e. natural rubber or synthetic rubber, with a resin component which, on its own, can only form hard and brittle polymers, for example polystyrene, it is possible to obtain synthetics which, although of practically the same hardness and dimensional stability as the hard and brittle component, exhibit a higher resistance both to shock and to impact.

It is also known that by grafting a monomer which, on its own is only able to form hard and brittle polymers, on to polybutadiene, it is possible to obtain graft polymers which, when mixed with a resin component, for example a copolymer of styrene with acrylonitrile, yields synthetics which, in addition to outstanding hardness and dimensional stability, exhibit also a high resistance both to shock and to impact.

Finally, it has also been proposed to manufacture synthetic exhibiting outstanding hardness and dimensional stability by grafting acrylic or methacrylic esters, together with styrene and acrylonitrile, on to polybutadiene.

Unfortunately, all these impact-resistant synthetics whose elasticising component is derived from butadiene or isoprene, have the disadvantage that, over a given period of time, they undergo some deterioration of their mechanical properties because the carbon-carbon double bonds still present in them are affected by atmospheric oxygen, particularly under the influence of light and heat.

In order to obviate this disadvantage, synthetics have already been developed in which the elasticising component comprises saturated elastomeric polymers, i.e. components which do not contain any aliphatic carbon-carbon double bonds and, for this reason, do not age so readily. Components such as these are, for example polybutyl acrylate and polyvinyl isobutyl ether. When polymers such as these are mixed with a resin component, for example polystyrene in suitable proportions, the resulting synthetics exhibit outstanding mechanical data after processing, but at the same time frequently show marked orientation. The mechanical properties of such polymer mixtures are therefore governed to a large extent by the direction in which the material flows during processing.

It is also known that impact-resistant synthetics of high impact strength can be prepared by grafting monomers for example styrene, or monomer mixtures, for example, styrene/acrylonitrile, on to a polyacrylic acid ester, and by subsequently mixing the resulting graft polymers with a resin component, for example a copolymer of styrene and acrylonitrile. In this instance, too the mechanical properties of the polymer mixtures are governed to a considerable extent by the direction in which the material flows during processing.

It has now surprisingly been found that, by mixing polymers which, on their own, are hard and brittle, for example, polystyrene, nuclear-substituted or side-chain-substituted polystyrene, copolymers of styrene and acrylonitrile or their alkyl- or halogen derivatives, with certain graft copolymers of vinyl chloride on copolymers of ethylene with vinyl esters, more particularly ethylene/vinyl acetate copolymers, which will be more fully discussed hereinafter, it is possible to obtain thermoplastic-elastic moulding compositions distinguished by outstanding mechanical properties, more particularly by their high notched impact and impact strengths, and by their excellent resistance to ageing and non-inflammability.

The mixtures according to the invention contain:

(A) 30 to 95% by weight of polymers which, on their own, are brittle and hard, such homopolymers or copolymers of styrene, homopolymers of nuclear- or side-chain-substituted styrenes or their copolymers with other vinyl or vinylidene compounds.

(B) 70 to 5% by weight of an elasticising graft polymer of vinyl chloride on ethylene/vinyl acetate.

Examples of hard and brittle polymers include pure polystyrene, nuclear-substituted or side-chain-substituted polystyrenes, such as polymers of nuclear-substituted alkylstyrenes with 1 to 4 carbon atoms, nuclear-substituted halogen styrenes, more particularly nuclear-substituted chlorostyrenes, or α-methylstyrene; styrene-acrylonitrile copolymers or copolymers of nuclear-substituted or side-chain-substituted styrenes with acrylonitrile or substituted acrylonitrile such as methacrylonitrile or α-chloro-acrylonitrile, with an acrylonitrile content of 5 to 50% by weight, preferably 10 to 50% by weight, and a K-value of 45 to 100 [according to Fikentscher, Cellulosechemie 13, page 58 (1932)], measured on a 0.5% by weight solution in dimethyl formamide at 20° C. They can all be prepared by the known processes of block polymerization, solution polymerization, precipitation polymerization, suspension polymerization or emulsion polymerization.

The hard and brittle polymers are preferably used in quantities from 35 to 85% by weight.

The graft copolymers used for the process according to the invention, are prepared by polymerization of vinyl chloride in the presence of ethylene/vinyl ester copolymers, in particular ethylene/vinyl acetate copolymers, for example by the process described in British patent specification No. 1,021,324.

Particularly suitable for the process according to the invention are graft copolymers with (i) 25–85% by weight of an ethylene/vinyl acetate copolymer containing 20 to 70% by weight, preferably 30 to 55% by weight, of vinyl acetate, and (ii) 75–15% by weight of grafted-on vinyl chloride.

The graft copolymers are preferably present in the mixture in quantities from 15 to 65% by weight. The mixtures of the hard component with the elasticising component may be prepared by means of the mixers normally used in the plastics industry, for example, mixing rolls, kneaders, twin-screw extruders or Banbury mixers. The two components are particularly effectively and homogeneously distributed when the components are mixed together in latex form and precipitated at the same time.

Depending on the purpose for which the ultimate moulding compositions are to be used, a variety of fillers, for example chalk, silicates or carbon black; pigments for example, titanium dioxide; lubricants for example stearates, plasticisers for example phthalates, phosphates or adipates; and stabilisers, for example basic lead sulphates, barium-cadmium soaps, organo-tin compounds, phosphite- and epoxide-co-stabilisers and similar auxiliaries, can be added to the mixtures, as can additives which reduce flammability and at the same time act synergistically, particularly in combination with the halogen-containing graft copolymer, such as oxides and sulphides of arsenic, antimony or bismuth.

The thermoplastic mixtures as defined in the foregoing may be moulded into shaped bodies, for example tubes, profiles, pipe fittings, mountings, sheets or films, which have to meet particularly stringent requirements as regards notched impact strength and resistance to ageing.

Whilst it has often in the past not been possible satisfactorily to mix elastomeric polymers with hard and brittle polymers, because the two components are not compatible with one another or show a tendency towards flow orientation, it is possible by the process according to the invention to obtain completely homogeneous graft polymer/resin mixtures which do not show any appreciable tendency towards flow orientation.

The polymer mixtures according to the invention exhibit better processing properties than the known mixtures of polyvinyl chloride with graft polymers of vinyl chloride on ethylene/vinyl acetate copolymers.

The graft copolymer/resin mixtures which can be obtained by the process according to the invention exhibit both a high resistance to ageing and excellent mechanical data, in particular high impact and notched impact strength.

Another advantage of the mixtures prepared with these graft polymers in accordance with the invention is that they are difficultly flammable, particularly in combination with sulphur or oxygen compounds of arsenic, antimony or bismuth.

Unless otherwise indicated, the parts indicated in the following examples represent parts by weight.

EXAMPLES 1 TO 8

The components, listed in Table 1, of a styrene-acrylonitrile resin with an acrylonitrile content of 28% by weight and a K-value of 61 (according to Fikentscher) are homogenised for 10 minutes in different quantities and with differently composed vinyl chloride/ethylene/ vinyl acetate graft copolymers (for data, see Table 1) in the presence of 0.5 part by weight of barium-cadmium laurate (heat stabiliser for the vinyl chloride polymer component) on a set of mixing rolls heated at 170° C. The resulting rough sheets are pressed into finished sheets at a temperature of 170° C. from which the test specimens required for mechanical testing are cut.

The test specimens were used for measuring tensile strength (kg./cm.$^2$) and breaking elongation (percent) in accordance with DIN 53504 (standard test specimen), impact strength and notched impact strength (kg. cm./cm.$^2$) according to DIN 53453 and ball indentation hardness after 60 seconds (kg./cm.$^2$) according to Draft DIN 53456.

The measured results are listed in Table 1. In comparison Example A, a non-modified styrene-acrylonitrile resin is compared with the modified mixtures (Examples 1 to 8).

TABLE 1

|  | Comparison Example A | Example | | | | | | | |
|---|---|---|---|---|---|---|---|---|---|
|  |  | 1 | 2 | 3 | 4 | 5 | 6 | 7 | 8 |
| Resin | 100 | 90 | 80 | 70 | 60 | 50 | 62 | 68 | 50 |
| Styrene | 72 | 65 | 57 | 50 | 43 | 36 | 45 | 49 | 36 |
| Acrylonitrile | 28 | 25 | 23 | 20 | 17 | 14 | 17 | 18 | 14 |
| Graft copolymer | 0 | 10 | 20 | 30 | 40 | 50 | 38 | 32 | 50 |
| Vinyl chloride |  | 4.3 | 8.6 | 12.9 | 17.2 | 21.5 | 18.0 | 12.2 | 30.0 |
| Ethylene |  | 3.1 | 6.2 | 9.3 | 12.4 | 15.5 | 6.8 | 13.8 | 13.3 |
| Vinyl acetate |  | 2.6 | 5.2 | 7.8 | 10.4 | 13.0 | 13.2 | 6.0 | 6.7 |
| Tensile strength (kg./cm.$^2$) | 479 | 546 | 540 | 405 | 320 | 260 |  |  |  |
| Breaking elongation (percent) | 15 | 15 | 20 | 35 | 160 | 210 |  |  |  |
| Impact strength (kg. cm./cm.$^2$) | 9 | 14 | 14 | X | X | X | 23 | 90 | X |
| Notched impact strength (kg. cm./cm.$^2$) | 1.7 | 2.0 | 2.5 | 5 | 20 | X | 3.0 | 10.8 | 17.3 |
| Ball indentation hardness 60″ (kg./cm.$^2$) | 1,480 | 1,420 | 1,140 | 885 | 650 | 460 | 700 | 820 | 760 |

NOTE.—X = Unbroken specimens.

It is apparent from the examples illustrated that the toughness of the styrene-acrylonitrile is improved very considerably by addition of the graft polymer of vinyl chloride on ethylene/vinyl acetate copolymers.

EXAMPLES 9 AND 10

The quantities of polystyrene listed in Table 2 (a commercially available polystyrene was used for these tests) were homogenized at 160° C. on mixing rolls with the graft polymers likewise listed in Table 2 in the presence of 0.5 part by weight of barium-cadmium laurate. Rolling time 10 minutes. The resulting rough sheets are pressed into finished sheets at 170° C. from which the test specimens are cut.

The measured data are listed in Table 2. A non-modified polystyrene was used for comparison in comparison Example B.

EXAMPLES 11 AND 12

The quantities listed in Table 2 of styrene-acrylonitrile resin containing 28% by weight of acrylonitrile were homogenised as in Examples 1–8 with the quantities, again listed in Table 2, of differently composed vinyl chloride/ethylene/vinyl acetate graft copolymers, in the presence of fillers and pigments.

The measured data are set out in Table 2.

EXAMPLE 13

A polymer mixture comprising (a) 6700 parts by weight of styrene-acrylonitrile resin containing 28% by weight of acrylonitrile and (b) 3300 parts by weight of a vinyl chloride/ethylene/vinyl acetate graft copolymer (40% by weight of vinyl chloride, 23% by weight of vinyl acetate and 37% by weight of ethylene) were homogenized for 10 minutes at 165° C. on mixing rolls in the presence of 100 parts by weight of barium-cadmium laurate acting as the heat stabiliser. The resulting rough sheet was granulated at 140° C. and the granulate was injection moulded into standard test specimens; the mechanical data are set out in Table 2.

In order to determine their resistance to ageing, the test specimens were subjected both to the Xeno-test and Weather-o-meter test, and were exposed to oxygen at 70° C. After the periods indicated in Table 3, the impact strength of the aged test specimens was measured in accordance with DIN 53453. The measured data are listed in Table 3.

mony pentasulphide (Example 17) were mixed on rolls at 165° C. with a mixture of 6700 parts of styrene-acrylo-

TABLE 2

|  | Comparison Example B | Example | | | | |
|---|---|---|---|---|---|---|
|  |  | 9 | 10 | 11 | 12 | 13 |
| Resin |  |  |  | 58 | 58 | 67 |
| Styrene | 100 | 67 | 58 | 42 | 42 | 48 |
| Acrylonitrile |  |  |  | 16 | 16 | 19 |
| Graft copolymer |  | 33 | 42 | 42 | 42 | 33 |
| Vinyl chloride |  | 13.0 | 17.0 | 22.0 | 22.0 | 11.0 |
| Ethylene |  | 11.0 | 14.0 | 14.0 | 14.0 | 9.0 |
| Vinyl acetate |  | 9.0 | 11.0 | 6.0 | 6.0 | 13.0 |
| Additives: |  |  |  |  |  |  |
| Chalk |  |  |  | 2.5 | 5.0 |  |
| TiO₂ |  |  |  | 2.5 | 5.0 |  |
| Tensile strength (kg./cm.²) |  |  |  |  |  |  |
| Breaking elongation (percent) |  |  |  |  |  |  |
| Impact strength (kg. cm./cm.²) | 20.0 | 31.0 | 41.5 | X | X | X |
| Notched impact strength (kg. cm./cm.²) | 2.0 | 5 | 10 | 16 | 12 | 23 |
| Ball indentation hardness 60" (kg./cm.²) | 1,100 | 570 | 400 | 670 | 680 | 600 |

It is clear from the examples illustrated that the toughness of the brittle resins is improved very considerably by addition of the graft copolymer of vinyl chloride on ethylene/vinyl acetate copolymers.

COMPARISON EXAMPLE C

This comparison example demonstrates the comparatively poorer resistance to ageing of an ABS-graft polymer.

7260 g. of a 28.9% latex of a graft polymer of 36 parts of styrene and 14 parts of acrylonitrile on 50 parts of polybutadiene (average particle size in the latex 0.4 to 0.6µ, measured with an ultra-centrifuge) are mixed with 9060 g. of a 43.2% latex of a copolymer of 72 parts by weight of styrene and 28 parts by weight of acrylonitrile with a K-value of 59.3. In this case, the ratio of graft polymer to resin was 35:65, based on solid polymer. 75 g. of a 20% aqueous emulsion of 2,2'-methylene-bis-4-methyl-6-cyclohexyl phenol are then stirred into this latex mixture. Accordingly, the mixture contains 0.25% of 2,2'-methylene-bis-4-methyl-6-cyclohexyl phenol, based on solid polymer. The polymer mixture thus stabilised was coagulated with 2% acetic acid, washed neutral and dried in vacuo at 70–80° C. The dried material was consolidated for 10 minutes on mixing rolls heated at 160° C. and then granulated. Standard test specimens were produced from the granulate by injection moulding. To determine their resistance to ageing, the test specimens were aged as described in Example 13. The impact strength of each of the test specimens aged for diffeernt periods, is shown in Table 3.

TABLE 3

|  | 0 hours | 50 hours | 100 hours | 150 hours | 200 hours |
|---|---|---|---|---|---|
| Xeno test: |  |  |  |  |  |
| Example 13 | 1/90.4 | 1/83.3 | 1/95.0 | 1/84.1 | 2/80.0 |
| Comparison Example A | X | 8/77.9 | 41.7 | 9.6 |  |
| Weather-o-meter test: |  |  |  |  |  |
| Example 13 | 1/90.4 | 3/80.8 | 4/84.2 | 3/63.7 | 5/40.0 |
| Comparison Example C | X | 46.3 | 42.5 | 10.4 |  |

|  | 0 days | 16 days | 32 days | 64 days |
|---|---|---|---|---|
| O²—ageing at 70° C.: |  |  |  |  |
| Example 13 | 1/90.6 | 9/66.2 | 69.8 | 42.3 |
| Comparison Example C | X | 6/83.8 | 69.6 | 22.5 |

(The figure preceding the oblique stroke relates to the number of test specimens out of a total of ten which broke).

A comparison of the results of Example 13 with comparison Example C shows that the products prepared in accordance with the invention exhibit far superior resistance to ageing.

EXAMPLES 14–17

250 parts of antimony trioxide (Example 14), 500 parts of antimony trioxide (Example 15), 250 parts of antimony pentasulphide (Example 16) and 500 parts of antinitrile resin with an acrylonitrile content of 30% by weight, 3300 parts by weight of a vinyl chloride/ethylene/vinyl acetate graft copolymer (40% by weight of vinyl chloride, 23% by weight of vinyl acetate and 37% by weight barium-cadmium laurate).

The resulting rough sheets were pressed into finished sheets at 170° C., from which the test specimens were cut.

The flammability of these test specimens was measured in accordance with ASTM–D–635.

The measured data are listed in Table 4.

COMPARISON EXAMPLE D 150 parts of antimony trioxide were mixed on mixing rolls at 165° C. with 3000 parts of a polymer mixture prepared in accordance with comparison Example C. The mixture was converted into test specimens as already described in Example 14 to 17. The results obtained from the flammability test are set out in Table 4.

TABLE 4

Flammability test according to ASTM–D–635

|  | Burning rate (cm./min.) | Time interval between removal of the burner and disappearance of flame (seconds) |
|---|---|---|
| Example 14 | Self-extinguishing | 30. |
| Example 15 | do | 8. |
| Example 15 | do | 8. |
| Example 16 | do | 50. |
| Example 17 | do | 10. |
| Comparison Example D | 5 | Continuous burning. |

A comparison of the results of Examples 14–17 with comparison Example D shows that the products prepared in accordance with the invention are much more difficultly flammable than ABS-polymers.

What is claimed is:
1. A thermoplastic moulding composition which consists of a mixture of
   (A) 5 to 70% by weight of a graft polymer of
      (a) 15 to 75% by weight of vinyl chloride on
      (b) 85 to 25% by weight of ethylene/vinyl acetate copolymer with a vinyl acetate content of 20 to 70% by weight, and
   (B) 95 to 30% by weight of a thermoplastic polymer of
      (a) 50 to 100% by weight of styrene, α-methyl styrene, nuclear substituted alkylstyrene with 1 to 4 carbon atoms in the alkyl group or nuclear substituted halogen styrene and
      (b) 50 to 0% by weight of acrylonitrile, methacrylonitrile or chloroacrylonitrile.
2. The composition of claim 1 wherein said vinyl acetate content of said vinyl acetate containing copolymer is from 30 to 70% by weight.
3. The thermopalstic moulding composition of claim 1 wherein (A) is 15 to 65% by weight and (B) is 85 to 35% by weight of said mixture.

4. The thermoplastic moulding composition as claimed in claim 3 wherein the vinyl acetate content of said vinyl acetate containing copolymers is from 30 to 55% by weight.

References Cited

UNITED STATES PATENTS

| | | | |
|---|---|---|---|
| 3,218,373 | 11/1965 | Salyer | 260—878 |
| 3,322,858 | 5/1967 | Coaker et al. | 260—876 |
| 3,358,054 | 12/1967 | Hardt et al. | 260—878 |
| 3,366,709 | 1/1968 | Baer | 260—878 |
| 3,432,576 | 3/1969 | Beer | 260—878 |

MURRAY TILLMAN, Primary Examiner

H. ROBERTS, Assistant Examiner

U.S. Cl. X.R.

260—23.5 R. 30.6 R, 31.8 M, 41 A, B, C, 45.75 R. K, 876 B, 878 R, 897 C, Digest 24